June 15, 1937.  R. A. POAGE ET AL  2,084,216
V-TYPE BRAKE FOR MOTOR VEHICLES
Original Filed June 27, 1935  2 Sheets-Sheet 1
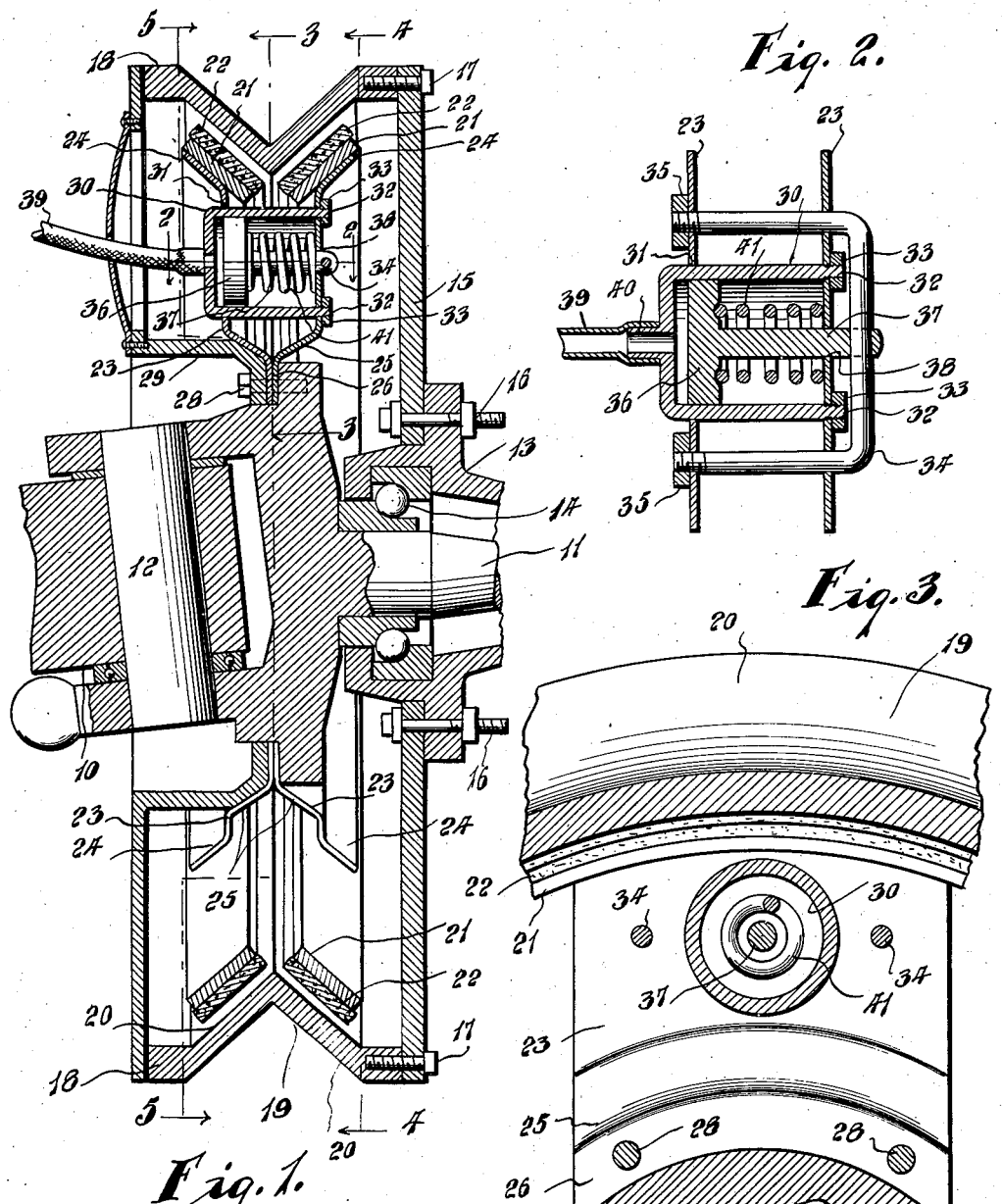
Inventors
R. A. Poage, M. Z. Poage Patented June 15, 1937

2,084,216

UNITED STATES PATENT OFFICE 2,084,216

V-TYPE BRAKE FOR MOTOR VEHICLES

Robert A. Poage, Panhandle, Tex., and Marlin Z. Poage, Tallahassee, Fla.

Application June 27, 1935, Serial No. 28,738
Renewed November 11, 1936

4 Claims. (Cl. 188—72)

This invention relates to a novel braking mechanism primarily adapted for use on the wheels of motor vehicles.

It is aimed to provide a novel construction consisting of braking elements disposed on opposite sides of a V-shaped braking surface of a brake drum, the latter being rotatable, and the former non-rotatable and adapted to clasp the drum.

It is also an object to provide a construction wherein the V-shaped part in the drum is integral therewith; wherein the arms or plates mounting the brake shoes, are effectively flexible so as to accurately accommodate the drum for yielding to conform to the braking surface; a construction in which the brake shoes are operatively inclined; in which the brake mechanism is particularly operable by oil pressure and move adjacent the shoes only to have more effective clasping and braking action.

The more specific objects and advantages will become apparent from a consideration of the description following taken in connection with accompanying drawings illustrating an operative embodiment.

In said drawings:—

Figure 1 is a view in central vertical section, illustrating our invention applied to front wheel structure of an automobile or similar vehicle wheel;

Figure 2 is a horizontal sectional view taken on the line 2—2 of Figure 1;

Figure 3 is a vertical sectional view taken on the line 3—3 of Figure 1;

Figure 4:
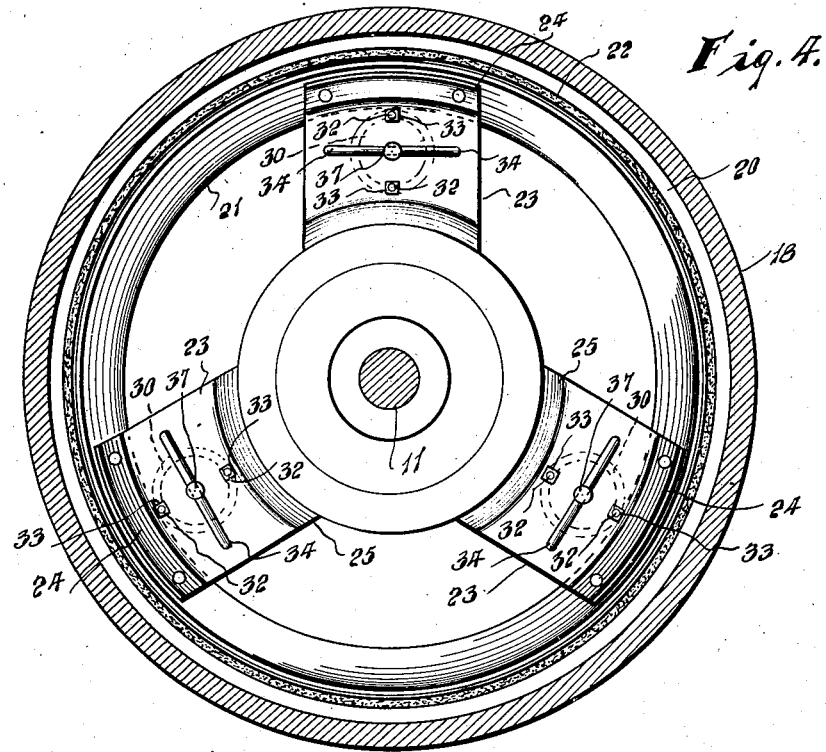
Figure 4 is a vertical sectional view taken on the line 4—4 of Figure 1.
Figure 5:
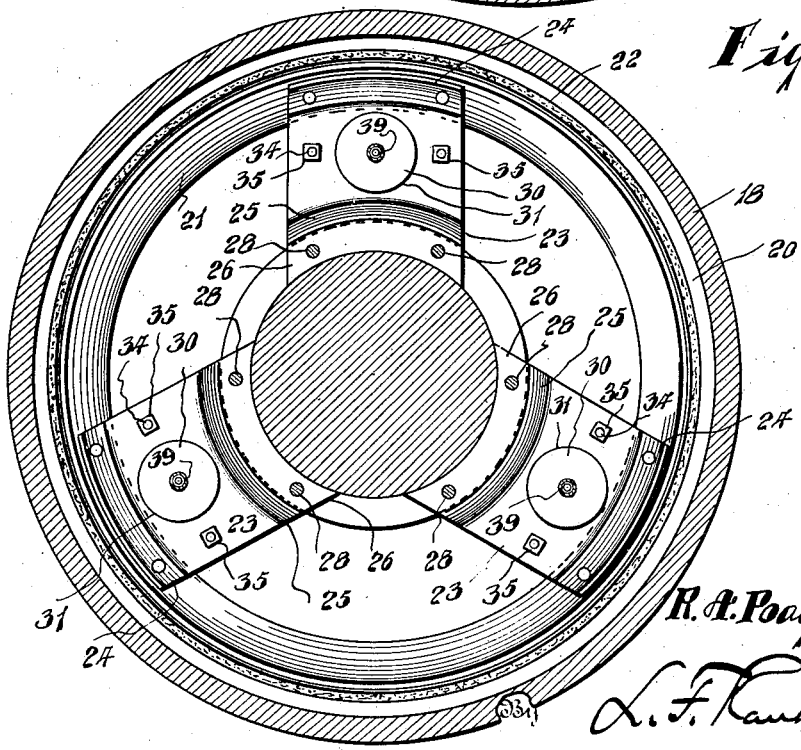
Figure 5 is a vertical sectional view taken on the line 5—5 of Figure 1.

Referring specifically to the drawings wherein like reference characters designate like or similar parts, 10 designates the front axle of an automobile to which a spindle 11 is pivoted in the usual manner as at 12 and on which a wheel, by means of a hub 13 and interposed bearing structure 14 is journaled. The parts described are conventional and are illustrated to make the construction and operation of our invention apparent.

A plate 15 is removably fastened as by means of bolts 16 to the hub 13 and secured laterally thereto as by means of bolts 17, is an annular brake drum 18. Such drum has a central annular depressed portion 19 which is thus integral therewith, forming an interior, V-shaped braking surface 20, thus having oppositely inclined braking surfaces.

Coacting with said oppositely inclined braking surfaces are shoes 21, preferably being lined or faced as at 22 with usual friction lining, which is adapted to directly engage the V-shaped braking surface when applied, but which is normally spaced therefrom as shown in Figure 1. It will be noted that the brake shoes are oppositely inclined.

Mounting said brake shoes, are a suitable number of metallic arms 23, those for the oppositely inclined brake shoes, being reversed whereby they are disposed in pairs, said arms having outwardly diverging portions 24 carrying the brake shoes, and having inwardly converging portions 25 at their opposite ends, terminating in fastening flanges 26, through which bolts or screws 28 pass to fasten the arms 23 to the spindle 11. Said bolts 28 also secure guard plates, preventing the entrance of dust and foreign matter, as indicated at 29.

Disposed primarily between the plates 23 of the different pairs, are cylinders 30, extending loosely through openings 31 in the inner plates 23 and being fastened by screw-threaded shanks 32 and nuts 33 to the other plates 23. Adjacent the cylinders 30, U-shaped bolts 34 pass through the outer plates 23 and are fastened removably by nuts 35 to the inner plates 23. Pistons 36 are slidable within the cylinders 30, having rods 37 slidable through openings 38 in the outer plates 23, and beyond the same being connected to the cross portions of the bolts 34 as shown.

Oil conduits of a flexible nature are employed at 39 detachably connected to nipples 40 of the cylinders 30. Such conduits 39 are adapted to form part of an hydraulic operating mechanism.

It will be understood, that all four wheels of the vehicle, or as many as desired, may be equipped in accordance with the invention, although only one has been illustrated.

In the operation of the device, upon oil in an hydraulic system entering the cylinders 30, such cylinders and pistons 36 will be moved outwardly relatively to each other, against the tension of springs 41 therein, such action since the cylinders are connected to the outer plates 23 and the pistons are connected to the inner plates 23, will cause the brake shoes of the different pairs to move toward each other and at the linings 22 grip and effectively clasp the oppositely inclined surfaces of the portion 19 of the brake drums. It will be realized that the plates 23 flex primarily at their outer end portions and due to the flexible nature of the plates 23, the shoes and their linings automatically adapt themselves to the angularity of the braking surfaces of said V-shaped portion 20.

Various changes may be resorted to provided they fall within the spirit and scope of the invention.

What is claimed is:—

1. In braking mechanism of the class described, a support, a brake drum, said drum having an inwardly pointing V-shaped portion providing diverging braking surfaces, shoes in diverging relation coacting with said surfaces, means operable to apply and release said shoes from said surfaces, said portion being integral with said drum, removable closure means secured to said drum, and removable closure means on said support, both of said closure means serving to enclose the operating parts of the braking mechanism.

2. In braking mechanism of the class described, a support, a member rotatable relatively thereto, a drum on said member, said drum having an inwardly pointing V-shaped portion providing diverging braking surfaces, shoes in diverging relation coacting with said surfaces, pairs of resilient arms fastened to the support, a cylinder fastened to an arm of each pair and passing loosely through the other arm thereof, pistons operable in said cylinders, means fastened to said other arm and pistons passing loosely through the remaining arm, and means operable to supply power fluids to and exhaust the same from the cylinders, said arms having outwardly diverging portions carrying said brake shoes.

3. In braking mechanism of the class described, a support, a member rotatable relatively thereto, a drum on said member, said drum having an inwardly pointing V-shaped portion providing diverging braking surfaces, shoes in diverging relation coacting with said surfaces, means operable to apply and release said shoes from said surfaces, pairs of resilient arms fastened to the support, said arms having outwardly diverging portions carrying said brake shoes, and means interposed between said arms, relatively movable and connected respectively with each arm operable to apply and release the shoes.

4. In braking mechanism of the class described, a support, a member rotatable relatively thereto, a drum on said member, said drum having an inwardly pointing V-shaped portion providing diverging braking surfaces, shoes in diverging relation coacting with said surfaces, means operable to apply and release said shoes from said surfaces, pairs of resilient arms fastened to the support, said arms having outwardly diverging portions carrying said brake shoes, and means interposed between said arms, relatively movable and connected respectively with each arm operable to apply and release the shoes consisting of a cylinder connected to one arm and passing through the other arms, a piston operable within the cylinder, a U-shaped bolt connected to the piston and to the other arm, and expansive spring means within the cylinder and engaging the piston.

ROBERT A. POAGE.
MARLIN Z. POAGE.